United States Patent [19]

Armitage

[11] Patent Number: 5,111,399
[45] Date of Patent: May 5, 1992

[54] SEISMIC APPARATUS AND METHOD INCLUDING USE OF TRANSPUTERS FOR REAL TIME PROCESSING OF DATA

[76] Inventor: Peter Robert Armitage, 82 Queen Street, Barry, South Glamorgan, United Kingdom

[21] Appl. No.: 303,666
[22] PCT Filed: Jul. 20, 1987
[86] PCT No.: PCT/GB87/00510
§ 371 Date: Jan. 19, 1989
§ 102(e) Date: Jan. 19, 1989
[87] PCT Pub. No.: WO88/00711
PCT Pub. Date: Jan. 28, 1988

[30] Foreign Application Priority Data

Jul. 19, 1986 [GB] United Kingdom ........... 8617674

[51] Int. Cl.$^5$ ............................................. G01V 1/36
[52] U.S. Cl. .................................... 364/421; 367/42
[58] Field of Search ........... 364/421, 420, 422, 724.16; 367/42, 60

[56] References Cited

U.S. PATENT DOCUMENTS 4,630,242 12/1986 Done ............................. 364/421
4,744,064 5/1988 Hughes ............................ 367/22

OTHER PUBLICATIONS

"Seismic Signal Processing via ILLIAC IV Computer", Gary Ackins et al, IEEE Trans. on Geoscience Elec., vol. GE-7, No. 1, Jan. 1961, pp. 34-41.
*Mini-Micro Conf. Record*, Nov. 1983, P. Cavill, "Transputer Systems", pp. 1-6.
AFIPS Conference Proceedings, 5-8, Jun. 1978, "Present and Future".
Peter Ekelmann, "Transputer: Mikrorechner-Konzept für hohe Verarbeitungsleistung", Elektronic, vol. 32 (1983).
Peter Cavill, "Transputer Systems", Mini-Micro Conference Record (1983), Nov. 8-11, San Francisco, CA U.S.A.

*Primary Examiner*—Gail O. Hayes
*Attorney, Agent, or Firm*—David P. Gordon

[57] ABSTRACT

A seismic processing apparatus comprises a plurality of processing modules (12), each module comprising a transputer (T) and a transversal filter (TF) with these transputers of the modules connected in a linear array by their links. The apparatus is able to carry out real-time demultiplexing of the seismic data from a plurality of receiver channels, and is able to carry out a number of other processing functions in the field, e.g. common depth point stacking, summing, correlation, convolution and two dimensional Fourier transforms.

10 Claims, 8 Drawing Sheets

SEISMIC APPARATUS AND METHOD INCLUDING USE OF TRANSPUTERS FOR REAL TIME PROCESSING OF DATA

FIELD OF THE INVENTION

This invention relates to a seismic processing apparatus and in particular to a portable apparatus capable of carrying out real time processing of data during acquisition and subsequent reprocessing of acquired data.

BACKGROUND OF THE INVENTION

The exploration for hydrocarbons and minerals at present is becoming of widespread importance, as the earth's resources are being consumed at an alarming rate. The seismic exploration method has proved very successful over the last 65 years for locating hydrocarbons. Today there is a great demand to adapt these techniques to the search for minerals, which places greater demands on the processing of data.

The basic principle of seismic exploration consists of transmitting a sound wave through the earth's rock structures and picking up reflected and/or refracted waves. Analysing the properties of these sound waves yields information about the earth's geological features. These features, together with samples taken from exploratory bore holes, enable the geologist to determine the position and extent of hydrocarbon and mineral deposits.

In land exploration, a large number of geophones are spaced apart along a line extending over many kilometers, in either one or both directions, from a sound source. In a typical land data acquisition arrangement, the geophones are each connected to a recording truck via independent channels, which may consist of multiconductor cables carrying analogue signals, or a single cable carrying a digital multiplexed signal from each geophone. At the recording truck the signals from each geophone channel are connected to a switching device which selects which channels are to be recorded. The sound source e.g. an explosive charge, is moved along the line at fixed intervals of distance, and the geophone channels selected for recording are those in the proximity of this sound source. At each interval or "shot point" a recording is made and in this manner data is acquired while moving along the exploration line.

In marine exploration the reflected and refracted sound waves are detected using a hydrophone streamer which is towed in a straight line behind a survey ship. The streamer consists of a number of sections, each containing a hydrophone (or group of hydrophones), and are linked to the recording equipment via independent channels. The ship moves along the exploration line towing the sound source, which produces a sound wave at fixed intervals of distance. The sound wave passes through the water into the earth's surface and the reflected and refracted waves are detected by the hydrophone streamer and recorded. In this manner data is acquired while the survey ship moves along the exploration line.

At present, digital recording is used almost exclusively in seismic exploration. This gives a large dynamic range, and signal processing techniques can be applied to the data directly using digital computers. Typical recording equipment used at present has a capacity of up to 120 channels, sampling rates in the range 0.25 to 4 milliseconds, and a dynamic range of 84 dB. The analogue-to-digital conversion generally consists of 14 bits for the magnitude, one bit for the sign and three bits to represent the gain applied to the amplifier during conversion. Data from each geophone is sampled sequentially, digitised and placed onto tape (i.e. in a multiplexed form).

As sound sources, explosives are used extensively for both land and marine exploration, but are now beginning to be replaced by other sources. For example, a weight drop method is often used in land exploration, in which a weight is dropped from a predetermined height onto the ground to produce the sound wave. The weight can be dropped many times at a particular location, and the reflected seismic signals detected by the geophones for each drop can be added to increase the signal amplitude. A method called vibroseis is frequently used for land exploration in which a mass in contact with the ground is made to vibrate with a frequency that is continuously changed or swept over a certain range. The swept frequency sound wave travels into the earth's surface and is reflected and refracted. Since a swept frequency of long duration is used, as opposed to a single shock or pulse, the detail from each reflecting structure is blurred. The detail is recovered using a process called correlation, which compresses the swept frequency waveform into a pulse. Thus, the signal from each geophone is cross-correlated with the signal or reference signal applied to the vibrating mass. The result is a record of the type obtained had a pulse been sent through the earth's surface. The vibroseis method has the advantage that there is control over the frequencies that are transmitted.

The ultimate aim of seismic data processing is to produce an image (a section) that is representative of geological features. In practice the final section that is produced is not a perfect representation of rock strata, and it has to be subjected to interpretation by experienced geologists and geophysicists.

The type of processing applied to the seismic data is very much dependent upon the type of exploration and the geology of the area. For example the exploration for oil, gas, coal and minerals requires different processing.

At present the infield processing of seismic data signals from the geophones is limited to filtering, noise rejection, summing and correlation. Portable data acquisition systems are known, which can be hand-carried into jungle regions or mounted in small trucks for desert use. Arrangements for summing of seismic data used with the weight drop method of exploration, and typical vibroseis data acquisition arrangement, which will perform infield correlation and summing, are large and can only be used mounted in large trucks. The summer and correlator are purpose built units and cannot be adapted to perform other functions. These various systems and arrangements provide data from the various channels recorded in multiplexed form on tapes.

The recorded data tapes from the field are sent to processing centres, where large main frame computers perform all the processing requirements to produce the seismic sections. The field tapes are first demultiplexed, which results in all the samples for channel 1 being separated for the first sound source position (shot point), followed by all the samples for channel 2, and so on. This is repeated for each shot point. The data is changed back from the geophones-sampled-sequentially form to channel-sequential form. This process on a VAX main frame computer is very time consuming and could be in terms of hours for a typical day's field data.

The second stage of processing is concerned with signal extraction and signal-to-noise enhancement. It is at this stage that noisy channels and spikes on the data are edited out. Data can also be summed or cross correlated, if this has not already been carried out in the field.

The third stage is geometric corrections. Survey data is placed into the computer at this point to provide corrections for the earth's terrain variations. Also included at this stage is sound velocity information, this being determined from refraction data.

The fourth and final stage is concerned with data enhancements, and it is at this point that very sophisticated techniques can be employed. The data can be filtered in two dimensions and can be used for the removal of noise generated by ground roll, which is a slow moving wave travelling in a shallow region (or "weathering layer") just below the earth's surface. The waveform is reshaped, using deconvolution, and compensates for changes in the shape of the sound wave as it passed through the rock layers.

A process called stacking is almost universally carried out which reduces the noise from multiple reflections. Trace amplitude equilization can also be applied to compensate for the weaker signals furthest from the sound source, time variable filtering to compensate for the attenuation at high frequencies, migration to transform the apparent reflection positions to true positions, which is useful near regions of geological faulting, and many other processes can be used, the final result being the required seismic section.

At present, data acquisition equipment tends to be in the form of separate units, each purpose built, and bolted together to form a recording system. Often the units come from different manufacturers, requiring appropriate interfacing circuitry to be built. This results in greater requirements for spare parts in the field, and greater expertise in personnel to repair the equipment if it should fail.

Over the years there has been a demand for more channels to be recorded. This has led to smaller identical units being added together to achieve greater channel capacity. These units were originally designed for independent use and using them in this way tends to lead to technical problems, such as longer sampling rates. The units cannot be bolted together in unlimited numbers.

SUMMARY OF THE INVENTION

In accordance with this invention, there is provided a seismic processing apparatus which comprises a plurality of processing modules, each module comprising a transputer and a transversal filter and the transputers of the modules being connected in a linear array. Preferably also each module further comprises an external memory for the transputer.

In this seismic processing apparatus, the processing modules are preferably identical, reducing spare part requirements and making repair an easier task. The apparatus may be made portable yet is able to carry out an immense amount of processing of seismic data in the field, as will be explained. Further, if additional channels are required, it is a simple matter to add the appropriate number of processing modules, one for each channel.

A particular processing function which the apparatus can perform is real time demultiplexing of sampled data input from the geophones or the like. The data which is input to the first transputer of the array is in channel-sequential order (for each shot point) and the demultiplexing serves to place the data for the different channels into the memories of respective transputer modules. This demultiplexed data can be further processed subsequently on the same linear array of transputers. A linear array of transputers may be arranged to demultiplex data other than seismic data and thus, in accordance with this invention, there is also provided a data demultiplexing apparatus comprising a linear array of transputers.

The stacking process may also be carried out on the linear array of transputers and further in accordance with this invention there is provided an apparatus for stacking values on a succession of channels in respect of a succession of instants, comprising a linear array of transputers arranged to receive the channel data at one end of the array and provide the stacked data at the other end of the array.

A further process which is commonly required in seismic data processing is a 2-dimensional Fourier transform. This may also be carried out by the linear array of transputer and further in accordance with this invention there is provided an apparatus for performing a 2-dimensional Fourier transform, comprising a linear array of transputers.

BRIEF DESCRIPTION OF THE DRAWINGS

An embodiment of this invention will now be described by way of example only and with reference to the accompanying drawings in which.

DESCRIPTION OF THE DRAWINGS

The Seismic Processing Apparatus

Figure 1:
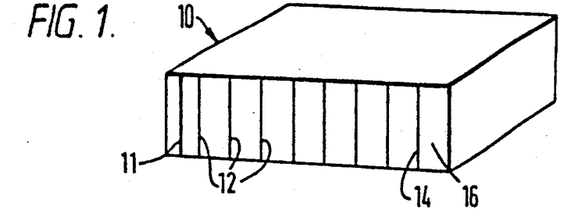
FIG. 1 is a general schematic view of a seismic processing apparatus in accordance with the invention.

Referring to FIG. 1, there is shown a seismic processing apparatus which is portable and able to carry out an immense amount of processing of seismic data in the field. In the example shown, the apparatus comprises a housing 10 divided into compartments or racks for receiving vertically-disposed circuit boards. At one end, an input interface board 11 will be placed, for receiving multiplexed digital signals from analog-to-digital converters which receive signals from the geophones or the like. There then follows a series of processing module boards 12, followed by an output interface board 14 for providing output to e.g. a visual display, a printer or a tape recorder. The apparatus also incorporates a power supply, for example at 16.

Figure 2:
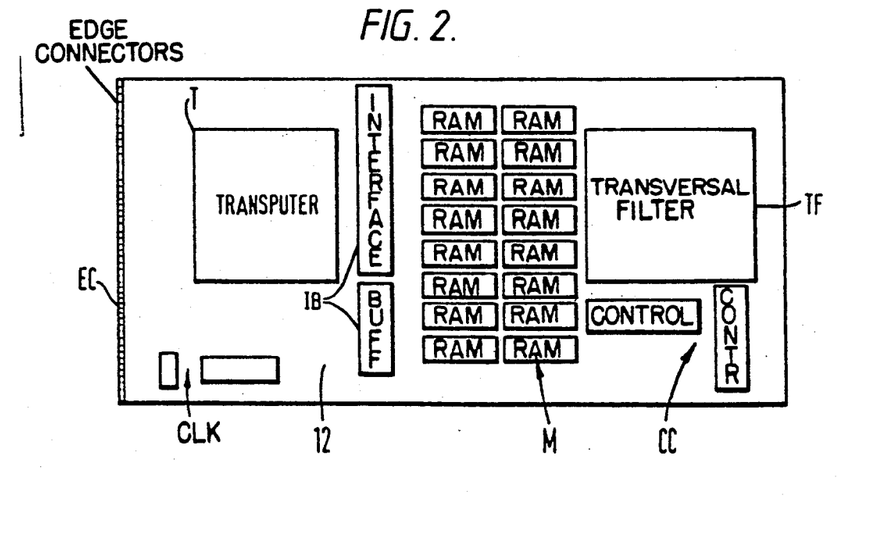
FIG. 2 is a schematic plan view of a processing module board of the apparatus.

Referring to FIG. 2, there is shown one of the processing module boards 12. This carries a transputer T, a transversal filter TF, clock circuitry CLK, control circuitry CC, RAM memory M (e.g. 512K bytes) and memory interface and buffers IB. The board is further provided with edge connectors EC for mating with connectors within the host apparatus. In the example shown, the transputer T is the T414 device and the transversal filter the A100 device, both manufactured by INMOS of Bristol, England.

The Transputer

Figure 3:
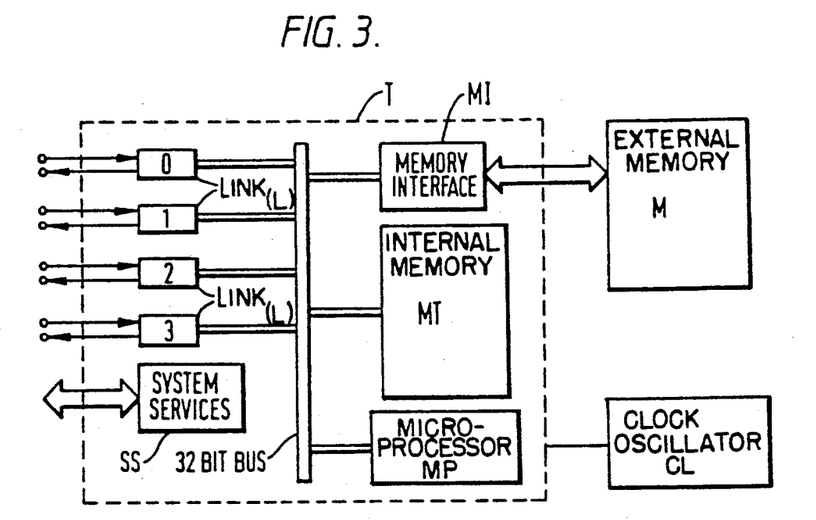
FIG. 3 is a diagram of the main elements of a transputer.

The transputer is one of the latest developments in very large scale integrated circuit technology and forms a new bulding block from which computer systems can be constructed. FIG. 3 shows use of the transputer T in conjunction with external memory M and a clock oscillator CL to form a basic processor. The transputer is a programable component and the T414 device contains a 32 bit micro processor MP to perform high speed arithmetic and logic functions at up to 10 million instructions per second; an internal memory MT of 2K bytes for very fast processor use, up to 80M bytes per second data rate; a memory interface MI so that each transputer can extend its memory capacity up to 4 G bytes, and four links L to provide connections for data transfer to and from the processor. Also included are various control and system service functions SS for processor initialisations and error detection.

Figure 4:
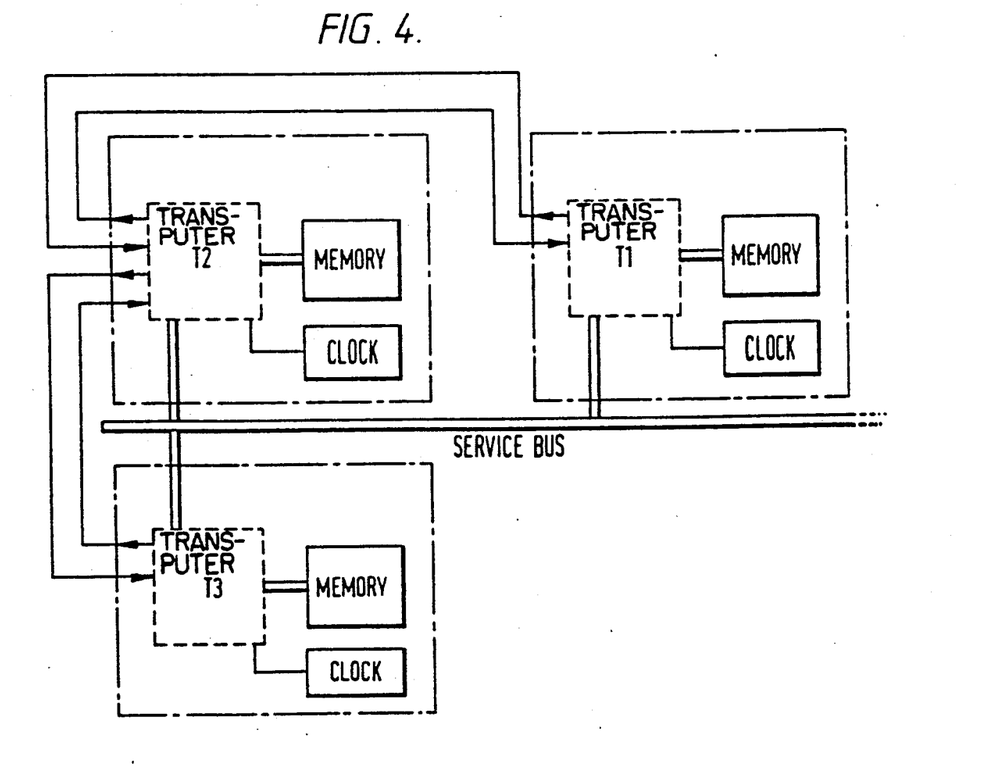
FIG. 4 is a diagram showing interconnection of transputers in an array.

A single processor can be linked to other processors to form a very sophisticated computer system and FIG. 4 shows how this interlinking is made between transputers T1, T2, T3. Communication can be established between other processors via the transputers links L. There are four such links on each transputer, each providing two channels one input and one output, data being fed along the channels in a serial form. The data is transferred from one processor to another via these links, under software control, at a rate of 20 million bits per second. This communication is synchronized and takes place only when both processors are ready, one to receive data and the other ready to transmit it.

The transputer is provided with facilities for initialisation and programs can be loaded into its memory MT via any one of its links L. Programs that have already been stored in its memory area, as ROM, can be executed directly. Error detection is possible which may be used to indicate a faulty transputer within a multiprocessor array.

OCCAM programming

OCCAM is a high level computer language developed by INMOS to be used with their transputer. Compiled OCCAM is very efficient, removing the need for a transputer assembly language. This enables users of transputer based systems to maintain a "standard language" which is independent of any changes in the design and structure of the transputer. Programs do not have to be adapted to these changes, nor do programmers have to relearn instruction sets and procedures.

OCCAM is one of the few languages that enable many processors to be linked together, each programmed to perform a separate task. These tasks could be small parts of a large mathematical or data processing problem. By allocating each processor to a part of the overall problem and executing these concurrently, the problem is solved efficiently. This is known as parallel processing.

A single transputer can be programmed, using OCCAM, to perform concurrent, or parallel processing. This is achieved by allowing a short time to work on each separate task in turn, until all tasks have been completed. In this way a program written to be used on an array of transputers can also be executed unchanged by a single processor.

In problem solving, the syntax of OCCAM allows the programmer a choice between parallel processing, where many tasks are performed concurrently, or sequential processing, where each task has to be completed before the next can begin.

Parallel processes can be distributed over many processors or contained within a single processor. In both cases, if a process needs to cooperate with another during computation, it is necesary to establish a communication link between them. OCCAM provides this linking by the formation of named channels and data is passed across these channels. The action of data transfer may be given the highest priority over all other processes, if desired.

Using OCCAM programming arrays of processors can be set up, each communicating with its neighbouring processor, so that data can be made to "flow" steadily through each processing element in turn. As the data flows through a processor it can be operated on: this is called systolic processing.

The Transversal Filter

The transversal filter is another of the latest developments by INMOS in very large scale integrated circuit technology and forms a building block from which advanced digital signal processors can be constructed. The transversal filter, incorporated into suitable hardware and under the control of software programming, can be made to perform many different digital processing functions at high speed. These functions include filtering, correlation, convolution, deconvolution and discrete Fourier transforms.

Figure 5:
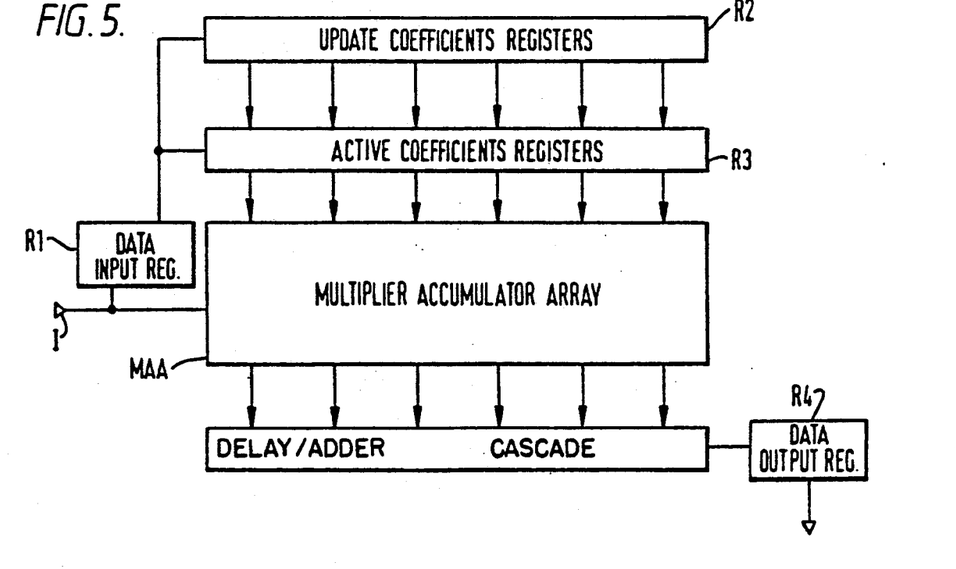
FIG. 5 is a diagram of a transversal filter.

FIG. 5 shows the INMOS A100 transversal filter. Data bytes, input serially at I, are placed into the filter by direct access to the registers R1, R2, R3. The multiplier accumulator array MAA consists of 32 parallel multipliers, each capable of multiplying two 16 bit binary numbers. Each product that results is passed through a cascade of delay and adders CDA and output serially through an output register R4.

Figure 6:
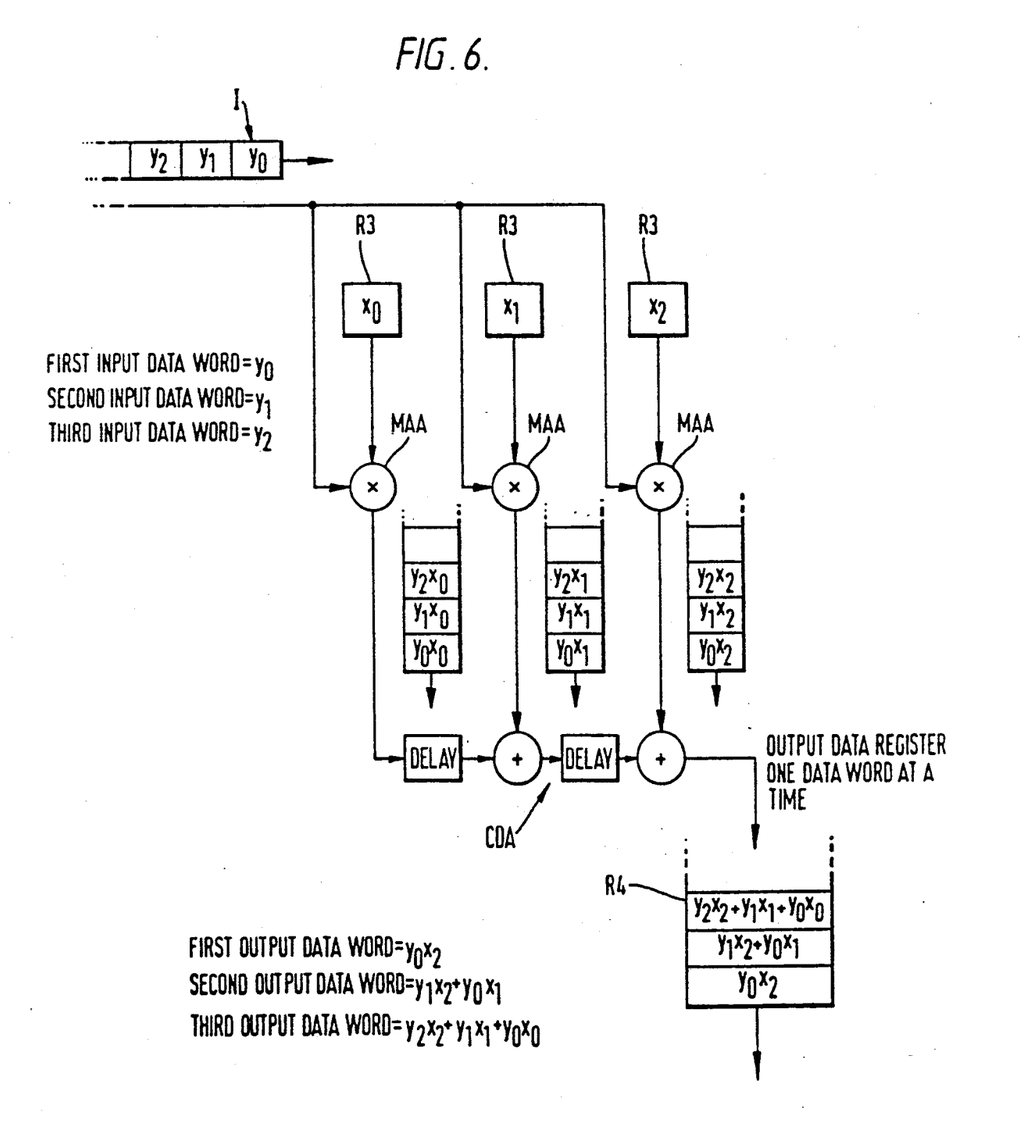
FIG. 6 is a diagram illustrating the operation of the transversal filter.

Three stages of the transversal filter are shown in FIG. 6, comprising the parallel multipliers and a cascade of delay and adders. There are a total of 32 stages on each device. The numbers $x_0$, $x_1$ and $x_2$ represent data placed in the active coefficient register. The stream of numbers $y_0$, $y_1$ and $y_2$ represent data being input to the device. At the first clock cycle $y_0$ is in the input data register. $y_0$ is then multiplied by $x_0$, $x_1$ and $x_2$ in parallel and their products are output to the cascade of delay and adders. At the second clock cycle $y_1$ is placed into the input data register, and this is multiplied in parallel by $x_0$, $x_1$ and $x_2$, these products then join the data being cascaded through the delay and adders. The result is a stream of data being output as shown in FIG. 6.

The output from the cascade is calculated to full 36 bit precision, to remove accumulative rounding errors. This is reduced by selecting 24 bits from these 36 for the final output. A programmable barrel shifter is used to make this selection.

Two coefficient registers are provided, an active register R3 and an update register R2. The update register can be accessed while the coefficients in the active register are being applied to the multipliers. When a new set of coefficients are to be loaded, the two sets of registers can be interchanged using a "bank swap" instruction.

The transversal filter can be cascaded to enable a greater number of parallel multiply-accumulate operations to be performed during any one clock cycle. The main criteria to consider with the design of a signal processing machine is its channel capacity and processing speed. With the advent of the transputer and transversal filter a new design philosophy can now be considered. The performance can be a function of the number of these devices that are present in a machine. The principle of parallel processing allows a designer to take a signal processing task and break this down into operations that can be performed concurrently, on as many individual processors that exist within the machine. With suitable programming it is only the speed of operation or channel capacity that will be affected by the number of processors present in the machine.

The channel capacity can be extended without degrading the speed of operation by ensuring that where possible all signal processing algorithms are capable of being executed independently, and therefore able to be performed in parallel. The addition of extra processors for each additional channel will then have no effect upon the overall operational speed of the machine, since all operations occur concurrently.

The ideas of systolic processing, that is where data streams are made to "flow" through processors, is readily adapted to the parallel processing principle. Since data flow rate is determined by the transputers link speed, and is fixed for a particular type of transputer, the data flow rate will be unaffected by the number of transputers in a data stream. This is because they all act at the same time to transfer data in to and out from a link (i.e. in parallel). If processing is to be performed on this data, the transputers can execute this concurrently.

The speed of processing can also be increased by the addition of extra processors, for a fixed channel capacity. The allocation of two transputers for each channel will enable faster or more complex processing to be carried out. The addition of extra transversal filters, cascaded together, will provide a greater number of parallel multiply-accumulate operations, during a time interval, thus giving rise to greater processing speed.

Thus in the seismic processing apparatus of FIG. 1, the transputers are connected in a linear array to provide for systolic processing and OCCAM programming can be employed.

Demultiplexing

Figure 7:
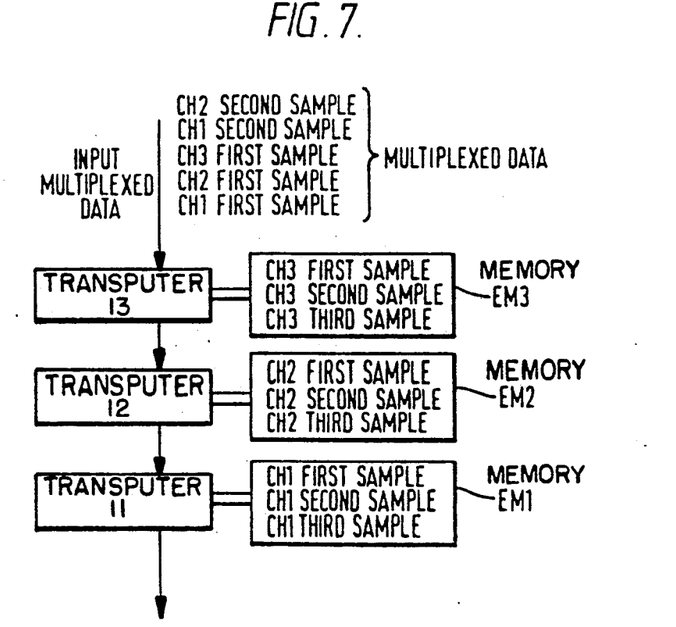
FIGS. 7, 7a and 7b are diagrams showing the operation of a linear array of transputers in demultiplexing input seismic data.

The sampled data received in multiplexed form is readily demultiplexed using the linear array of transputers. The data samples are made to "flow" through each transputer and the channels separated and this procedure is shown in FIG. 7 for the example of three channels. After the data has been separated into its allocated transputer T1, T2, T3, one for each channel CH1, CH2, CH3, it can then be processed or stored directly in memory EM1, EM2, EM3.

The speed at which data can be transferred in and out of a transputer is 20 million bits per second, and data written into memory in typically less than a micro second, depending on the external memory speed. These time periods are insignificant compared to the intervals between data samples.

Sampled data from most analogue to digital converters used at present are in a SEG (Seismic Exploration Geophysical) standard. This consists of 14 bit magnitude, one sign bit and a three bit code to represent the gain applied to the amplifier during the conversion. The SEG standard data may have to be converted to another form, such as 32 bit floating point, to make it compatible with other processes. This conversion can be made within each transputer. Analysis of the data can also be undertaken, such as noise rejection, where noisy channels are muted. To optimise performance parallel processing can be used, the data converted, noise rejected, and data loaded to memory or routed to other transputers all concurrently.

Figure 7A:
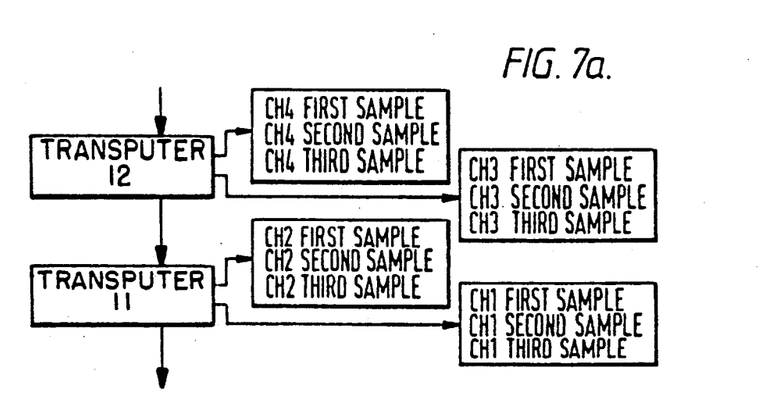
Figure 7B:
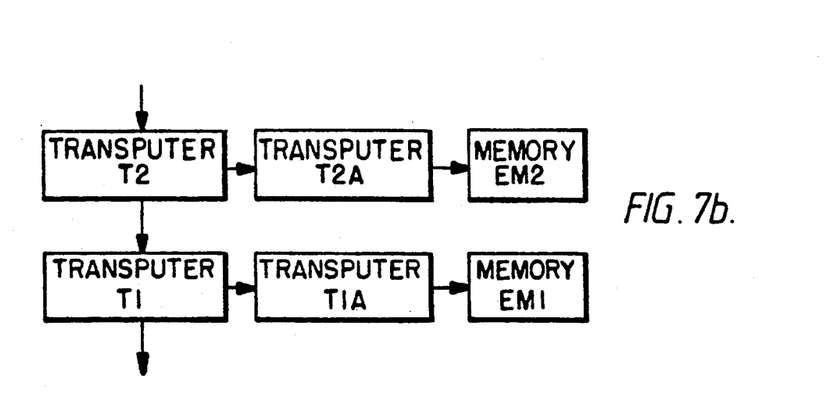

FIG. 7 shows data for each channel being separated into its allocated transputer. Additional channels can be incorporated by providing more transputers, one for each channel, in the data flow stream. The addition of extra transputers will not have any effect on the operating speed since data is passed across all the transputers concurrently. If processing in the transputer is required the overall processing time will be that for a single transputer to perform this operation, as this same operation is executed independently and concurrently on all the other transputers. The channel capacity can be extended at the cost of operational speed by allocating one transputer to two or more channels, as shown in FIG. 7a. The speed of processing, or more complex processing, can be increased by allowing two or more transputers to each channel and this is shown in FIG. 7b.

Subsequent to demultiplexing (and in some cases at the same time as demultiplexing) further processing of the acquired data may be carried out by the seismic processing apparatus of FIG. 1. These various processing functions will now be described.

Geometric Corrections

The reflections from rock structures, detected at the earth's surface, are misaligned due to the source and receivers being located at different elevations and different distances apart. This misalignment must be corrected prior to further processing.

The two geometric corrections required are (1) a vertical correction to place the source and receiver on the same horizontal plane (since the earth's terrain varies) and (2) a horizontal correction to place the source and receiver on the same vertical plane (since the sound ray paths have travelled different distances). To make these corrections the data for each channel is time-shifted. The first correction entails shifting the entire channel data by the same amount, either up or down, depending on the position of the datum plane relative to the source and receiver. This is called the terrain correction, and requires survey information. The second correction is a time-variant correction in which the channel data is shifted by varying amounts along its length. This is called the normal move out correction, and requires information from refraction crews of the sound wave velocities.

In the apparatus of FIG. 1, the channel data is stored in memory, each sampled byte of data located at a specific address, within each transputer's memory address area. These addresses can be made contiguous, in which case their memory address number represents time. To shift a channel's data in time is then effected by read-dressing memory locations. The geometric corrections to the data can be implemented by programing each transputer to shift the data in its memory area. This programming can be executed concurrently i.e. on all transputers (all channels) at the same time.

Common Depth Point Stacking

Figure 8A:
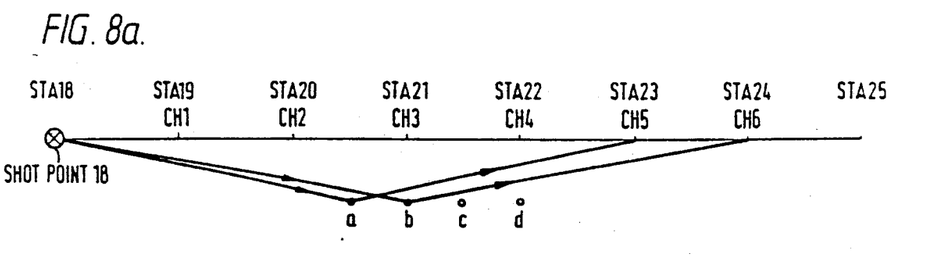
FIGS. 8a, 8b, 8c and 8d are a series of diagrams illustrating the requirements for CDP stacking.

This procedure is applied after geometric corrections have been made. A point below the earth's surface is defined (the common depth point or CDP). Reflected sound waves from this point, for various source and receiver positions, are added together or stacked. An example of this stacking process is shown in FIG. 8. Six channels are recorded to the right of the shot point position, at the station intervals. FIG. 8a shows the shot point at STA 18, the first channel recorded (CHl) is on STA 19.

Figure 8B:
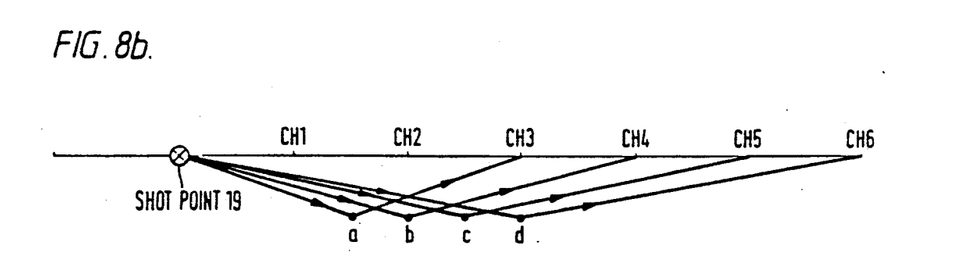
Figure 8C:
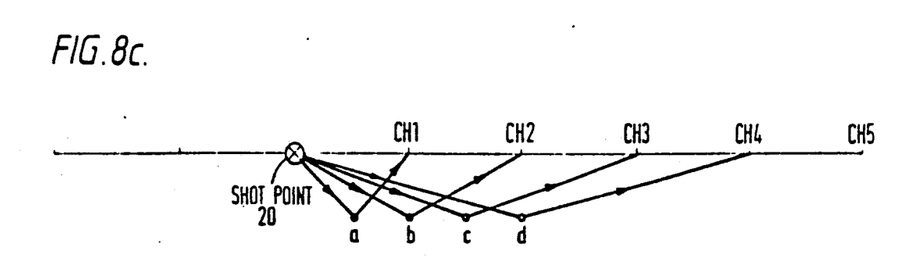
Figure 8D:
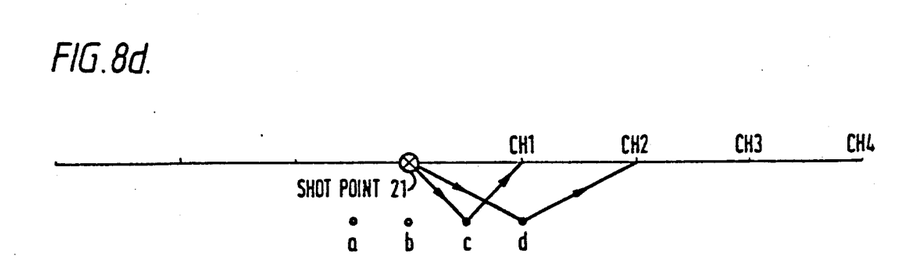

The sound waves from the shot point are considered as rays. At point a the sound ray incident upon it will be reflected, the angle of the reflected ray being equal to the angle of the incident ray. This reflected ray is detected at the receiver on station STA 23 and recorded on channel CH5. Likewise the reflected ray from point b will be detected at STA 24, channel CH6. FIGS. 8b to 8d show the incident and reflected sound rays for the common depth points a to d for the shot positions STA 19 to STA 21.

The recorded channels contain information on reflections from each of the points a to d. The recorded channels which contain the data for a specific common depth point are added together (stacked). Thus to stack the data corresponding to the common depth point a, the CH5 of shot point 18 is added to the CH3 of shot point 19 and this is then added to the CH1 of shot point 20.

Common depth point stacking provides a method by which noise of the same frequency can be separated from signal information, and is particularly useful to reduce the effects from multiple reflections.

Table 1 shows how the linear array of transputers is used to perform the CDP stacking process, the method using systolic processing. Data in a demultiplexed and geometric corrected form is input to the transputer array. In this example, shot point STA 18 channels CH1 to CH6 are first input. The channel data is separated and placed into their allocated transputer's memory, CH1 in transputer 3, CH2 in transputer 4 and so on. When this has been completed for the shot point STA 18 the data contained in each transputer's memory is moved down the array by two transputer locations (shift by 2). The next shot point STA 19 data is then input to the transputer array, and the channels separated as before. The data corresponding to shot point STA 19 channels CH1 to CH6 are then added to the data already in the transputer's memory, corresponding to the previous shot points data, which has been shifted by two locations.

TABLE 1

| | | | CONTENTS OF MEMORY AT VARIOUS TIMES | | | | | | | |
|---|---|---|---|---|---|---|---|---|---|---|
| | INPUT SP18 DATA | SHIFT BY 2 | ADD IN SP19 DATA | SHIFT BY 2 | ADD IN SP20 DATA | SHIFT BY 2 | ADD IN SP21 DATA | SHIFT BY 2 | ADD IN SP22 DATA | SHIFT BY 2 |
| INPUT DATA | | | | | | | | | | |
| T8 | SP18:CH6 | — | [SP19:CH6 + —] | — | [SP20:CH6 + —] | — | [SP21:CH6 + —] | — | SP22:CH6 | — |
| T7 | SP18:CH5 | — | [SP19:CH5 + —] | — | [SP20:CH5 + —] | — | [SP21:CH5 + —] | — | SP22:CH5 | SP22:CH6 |
| T6 | SP18:CH4 | SP18:CH6 | [SP19:CH4 +SP18:CH6] | [SP19:CH4 +  — ] | [SP20:CH4 +SP19:CH6] | [SP20:CH4 +  — ] | [SP21:CH4 +SP20:CH6] | [SP21:CH6 +  — ] | [SP22:CH4 +SP21:CH6] | [SP22:CH4 +SP21:CH6] |
| T5 | SP18:CH3 | SP18:CH5 | [SP19:CH3 +SP18:CH5] | [SP19:CH3 +SP18:CH5] | [SP20:CH3 +SP19:CH5] | [SP20:CH5 +  — ] | [SP21:CH3 +SP20:CH5] | [SP21:CH5 +  — ] | [SP22:CH3 +SP21:CH5] | [SP22:CH3 +SP21:CH5] |
| T4 | SP18:CH2 | SP18:CH4 | [SP19:CH2 +SP18:CH4] | [SP19:CH4 +SP18:CH6] | [SP20:CH2 +SP19:CH4 +SP18:CH6] | [SP20:CH4 +SP19:CH6] | [SP21:CH2 +SP20:CH4 +SP19:CH6] This is stacked d | [SP21:CH4 +SP20:CH6] | [SP22:CH2 +SP21:CH4 +SP20:CH6] | [SP22:CH4 +SP21:CH6] |
| T3 | SP18:CH1 | SP18:CH3 | [SP19:CH1 +SP18:CH3] | [SP19:CH3 +SP18:CH5] | [SP20:CH1 +SP19:CH3 +SP18:CH5] This is stacked c | [SP20:CH3 +SP19:CH5] | [SP21:CH1 +SP20:CH3 +SP19:CH5] This is stacked c | [SP21:CH3 +SP20:CH5] | [SP22:CH1 +SP21:CH3 +SP20:CH5] | [SP22:CH3 +SP21:CH5] |
| T2 | — | SP18:CH2 | [— +SP18:CH2] | [SP19:CH2 +SP18:CH4] | [— +SP19:CH2 +SP18:CH4] | (Stacked) b | (Stacked) d | (Stacked) d | (Stacked) d | [SP22:CH2 +SP21:CH4 +SP20:CH6] |
| T1 | — | SP18:CH1 | [— +SP18:CH1] | [SP19:CH1 +SP18:CH3] | [— +SP19:CH1 +SP18:CH3] | (Stacked) a | (Stacked) c | (Stacked) c | (Stacked) c | [SP22:CH1 +SP21:CH3 +SP20:CH5] |
| OUTPUT STACKED CDP's | | | | | | OUTPUT: Stacked a and Stacked b | | OUTPUT: Stacked a and Stacked b | | OUTPUT: Stacked c and Stacked d |

(Shot point 20 CH1 to 6 etc.
(Shot point 19 CH1 to 6
(Shot point 18 CH1 to 6

The data now contained in the transputer's memory is again moved down the array by two transputer locations (shift by 2). The next shot point data STA 20 is then input to the transputer array.

This procedure is continued as shown in Table I reading from left to right. The values of stacked a, stacked b, stacked c and so on will be "flowing out" at the output end of the transputer array.

In this way CDP stacking becomes a continuous process, data being input at the top of the array, and the stacked CDP data values output at the bottom.

The length of the array will depend upon how many transputers are available in the apparatus. One transputer could be made to perform the function of two or more of those shown in Table I, however this would slow down the speed of operation.

Signal Processing

Most advanced signal processing operations can be reduced to a mathematical notion of the form:

$$\text{processed value at } t = \int_{n(min)}^{n(max)} f(n)g(n+t)dt \quad (1)$$

Written in words this means: The value of the processing operation at a specific value of t is the sum of all the products of the two functions f(n) and g(n+t) over all the values of n between n's lower and upper values. In this form n and t are considered to vary continuously.

For the seismic processor the data comprises sampled values of a continuous signal, and is thus discrete in nature. The expression then takes the form:

$$\text{processed value at } t = \sum_{n(min)}^{n(max)} f(n)g(n+t)$$

where n and t are discrete variables.

If n is considered to vary in integer values from 1 to N, then the expression can be written as the series:

processed value at $t = f(1)g(1+t) + f(2)g(2+t) + \ldots f(N)g(N+t)$

If $\underline{t}$ is considered to vary in integer values from 0 upwards then this can be written as:

$$\underset{(at\ t=0)}{\text{processed value}} = f(1)g(1) + f(2)g(2) + \ldots f(N)g(N)$$

$$\underset{(at\ t=1)}{\text{processed value}} = f(1)g(2) + f(2)g(3) + \ldots f(N)g(N+1)$$

$$\underset{(at\ t=2)}{\text{processed value}} = f(1)g(3) + f(2)g(4) + \ldots f(N)g(N+2)$$

... and so on ...

There is thus a direct relationship between the mathematical notion involving the integration of two functions (equation 1) and the summation of a series of products of the two functions. Any signal processing operation represented in the form of equation 1 can thus be implemented by the summation of a series of products.

The transversal filter will implement this summation of the products of two functions f(n) and g(n+t), if the coefficient register contains the f(n) terms and the g(n+t) terms are applied to the input. The output of the transversal filter is the processed values at t=0, t=1, t=2 ... etc.

Summing

If the weight drop method is used, this requires the addition (in each channel) of data samples received from successive weight drops at a particular location. Usually eight to twelve drops are used. This summing can be achieved after demultiplexing in the apparatus of FIG. 1. Thus, once the data for each channel is stored in the respective memory, subsequent data for that channel in respect of the next weight drop is added directly to that previously stored. Alternatively, two sets of memory area may be allocated to the data, the first set for data already summed and the second set for the data being sampled. If the sampled data is checked and found valid it is then added to the first set. In this way should the incoming data be in error the weight drop need only be repeated once.

Correlation

Corelation is required when the vibreosis technique is used. In order to correlate two signals, for example a sampled seismic signal a and a pilot signal p, the mathematical process required will be given by:

$$\text{correlated value at time } t = \int_{n(min)}^{n(max)} p(n)a(n+t)dt$$

Where the difference between the upper and lower limits of n is known as the depth of investigation.

The form of this equation is identical to that of equation 1, thus it can be implemented directly on a transversal filter.

The sampled pilot values p1, p2, p3 ... pN, are placed in the coefficient register and the sampled seismic data signals a1, a2, a3 ... aN for the given channel are applied to the input of the respective transputer.

Convolution

To convolve two signals a and b the mathematical process required is given by:

$$\text{convolved value at time } t = \int_{n(min)}^{n(max)} a(n)b(n-t)dt$$

The form of this equation is not the same as equation 1. However, upon the substitution t=−t then it becomes the same as equation 1. The physical interpretaion of this substitution is that the order of the data is reversed in time.

Thus to implement convolution on a transversal filter it is necessary to input signal b's data in reverse order of time (sampling data first).

Alternatively if the order of a's signal data is reversed, and b's signal data in normal time, then the effect is the same. To implement convolution on a transversal filter the sampled waveform a1, a2, a3, ... aN is placed into the coefficient register in reverse order (i.e. aN, aN−1 ... a2, a1). The waveform b1, b2, b3 ... is placed at the input. The seismic processing apparatus of FIG. 1 is thus able to perform convolution on the data of the respective channels.

Filtering in Real Time

The apparatus of FIG. 1 may be programmed to carry out filtering in real time. Filtering can be understood as a convolution process. The convolution theorem states: convolution in the time domain is equivalent to multiplication in the frequency domain. This theorem is used to perform real time filtering and the stages are shown in FIG. 9.

Figure 9A:
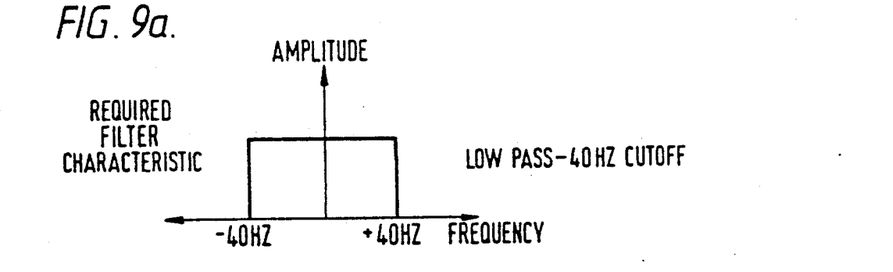
FIGS. 9a, 9b, 9c and 9d are a series of diagrams illustrating the principle of filtering by convolution.
Figure 9B:
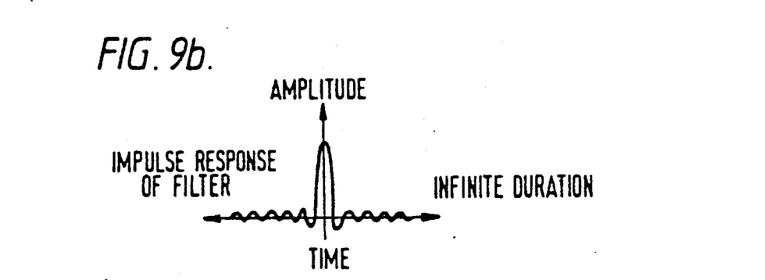
Figure 9C:
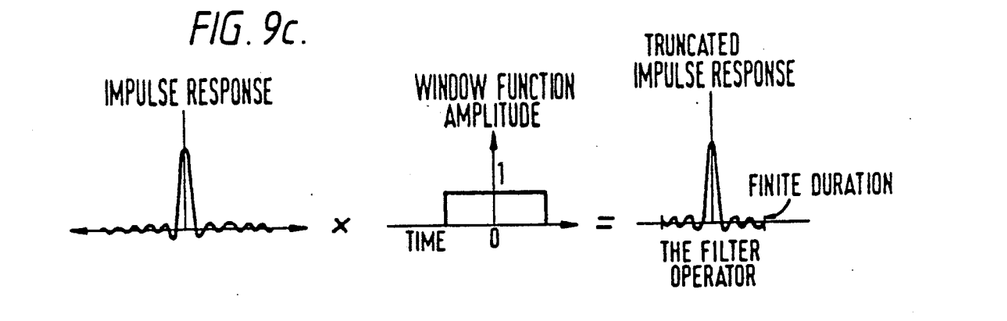

In the first stage the required filter characteristic is defined, FIG. 9a. The impulse response of this desired filter characteristic is computed, and for this example turns out to be a sinc function, shown in FIG. 9b. Unfortunately, this waveform has infinite duration and for practical purposes has to be truncated. To do this a "window function" is used, for this example a rectrangular window function, shown in FIG. 9c. This produces a filter operator. Other window functions can be used resulting in more desirable filter characteristics (e.g. Hanning, Hamming and Bartlett windows).

Figure 9D:
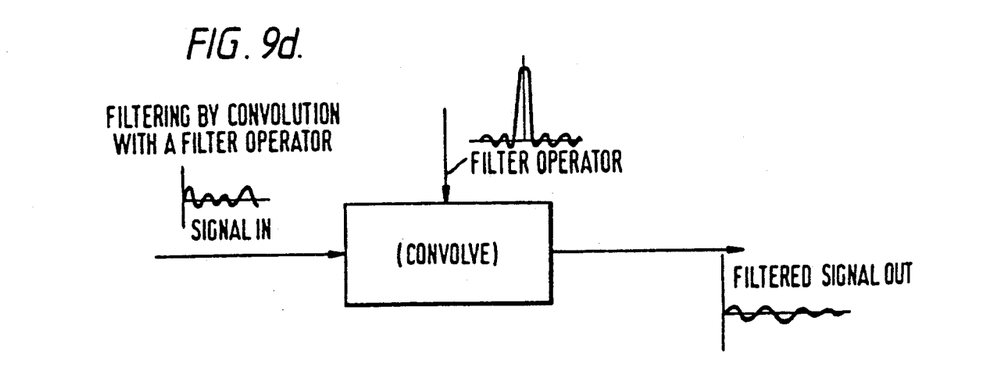

This filter operator is convolved with an incoming signal in real time, and the result is a signal that has been filtered as required, shown in FIG. 9d.

Mathematically by convolving the signal with the filter operator in real time the frequency spectra of the incoming signal is multiplied by the frequency spectra of the filter operator (i.e. the desired filtering). Frequencies above 40 HZ are multiplied by zero, those below 40 HZ multiplied by 1. Thus the incoming signals spectra is modified in the frequency domain.

In practice the filter operator will be loaded into the coefficient register of the transversal filter (in reverse order), and the sampled seismic signals applied to the input.

This type of filtering belongs to the class of Finite Impulse Response filters (FIR), they have no poles and the number of zeros is equal to the number of coefficients in the transversal filters's coefficient register. The phase response is linear and has the advantage that the response is defined exactly, and is reproducible from machine-to-machine, unlike LCR filter circuit elements.

The filter operator need not be fixed, and changes to it can be made in time to produce a time varying filter. Alternatively, it can be automatically adjusted to optimise filtering in a specific application, for example a tracking notch filter to remove mains interference.

Fourier Transform

The apparatus of FIG. 1 is preferably arranged to perform Fourier transform on the demultiplexed seismic data. The Fourier transform converts a signal waveform described as a time varying function to a description in terms of frequency components. Thus it is a time-domain to frequency-domain transformation. This is expressed mathematically by the relationship:

$$f(t) = \frac{1}{2\pi} \int_{-\infty}^{\infty} F(W)e^{jwt}dw$$

$$F(w) = \int_{-\infty}^{\infty} f(t)e^{-jwt}dt$$

where f(t) represents a function of time (waveform magnitude at time t seconds) and F(w) represents a function of frequency (the magnitude of the frequency component at w cycles per second)

It is also possible to consider a waveform that is described as a position varying function (as opposed to time varying). If this waveform, expressed as distance, is Fourier transformed the result is in terms of the number of cycles per unit of measurement, that is cycles per meter. This unit is given the name wavenumber.

There are many ways in which the discrete Fourier transform can be implemented. The linear transputer array can be used for implementation of the Cooley-Tuckey radix-2 Fast Fourier Transform method. Or the transversal filters and transputers can be used for the chirp-Z transform method.

Figure 10A:
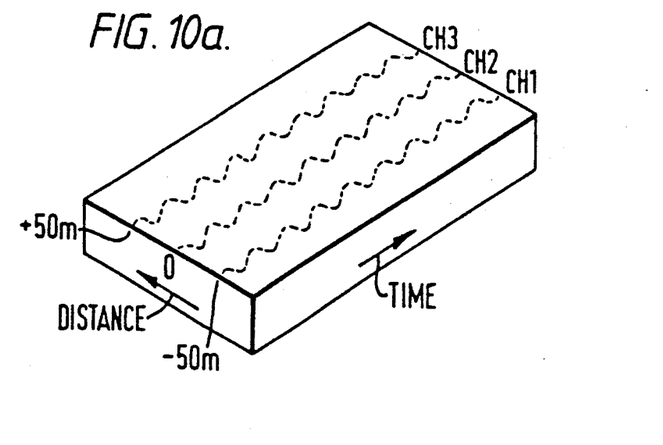
FIGS. 10a, 10b and 10c are a series of diagrams illustrating the 2-dimensional Fourier transform of seismic data.
Figure 10B:
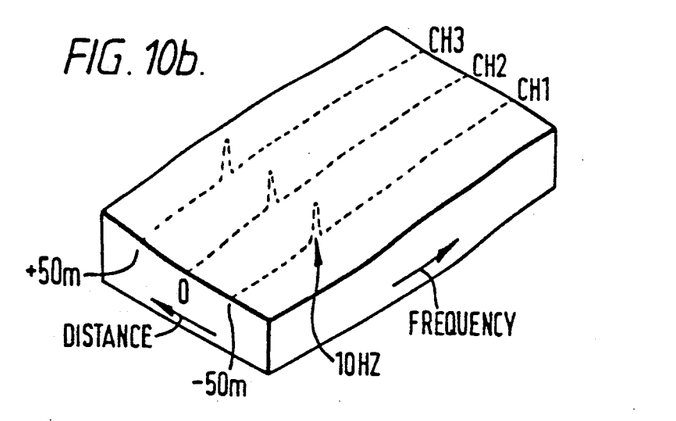
Figure 10C:
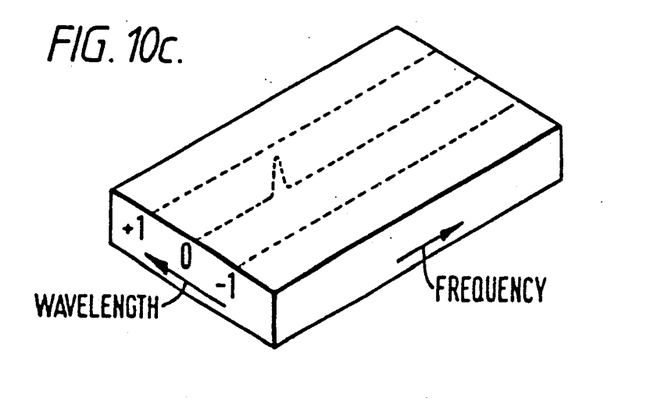

In seismic exploration the data is composed of many channels of information, each channel containing a waveform that varies in time. These channels each represent receivers located at a specific distance apart. This is shown in FIG. 10a. The data can be represented as forming a surface, with time in one direction and distance in the other. To perform many sophisticated signal processing operations on this data transform techniques can be used and one such transform is the two dimensional Fourier transform. FIGS. 10b and 10c show the stages of this transform process. First the data for each channel, along the time axis, is transformed using the Fourier transform technique described before. The waveform becomes a function of frequency content, the time axis becomes a frequency axis. The Fourier transform is then taken for all the data points along the distance axis, for each interval of frequency. The distance axis becomes a wave-number axis.

It is found that data transformed in this way renders itself very amenable to mathematical manipulation, which means that very complex processing tasks can be performed using simple operations. The transformed data having been manipulated can then be transformed back to its original time-distance form by the application of a further two dimensional Fourier transfom.

Figure 11:
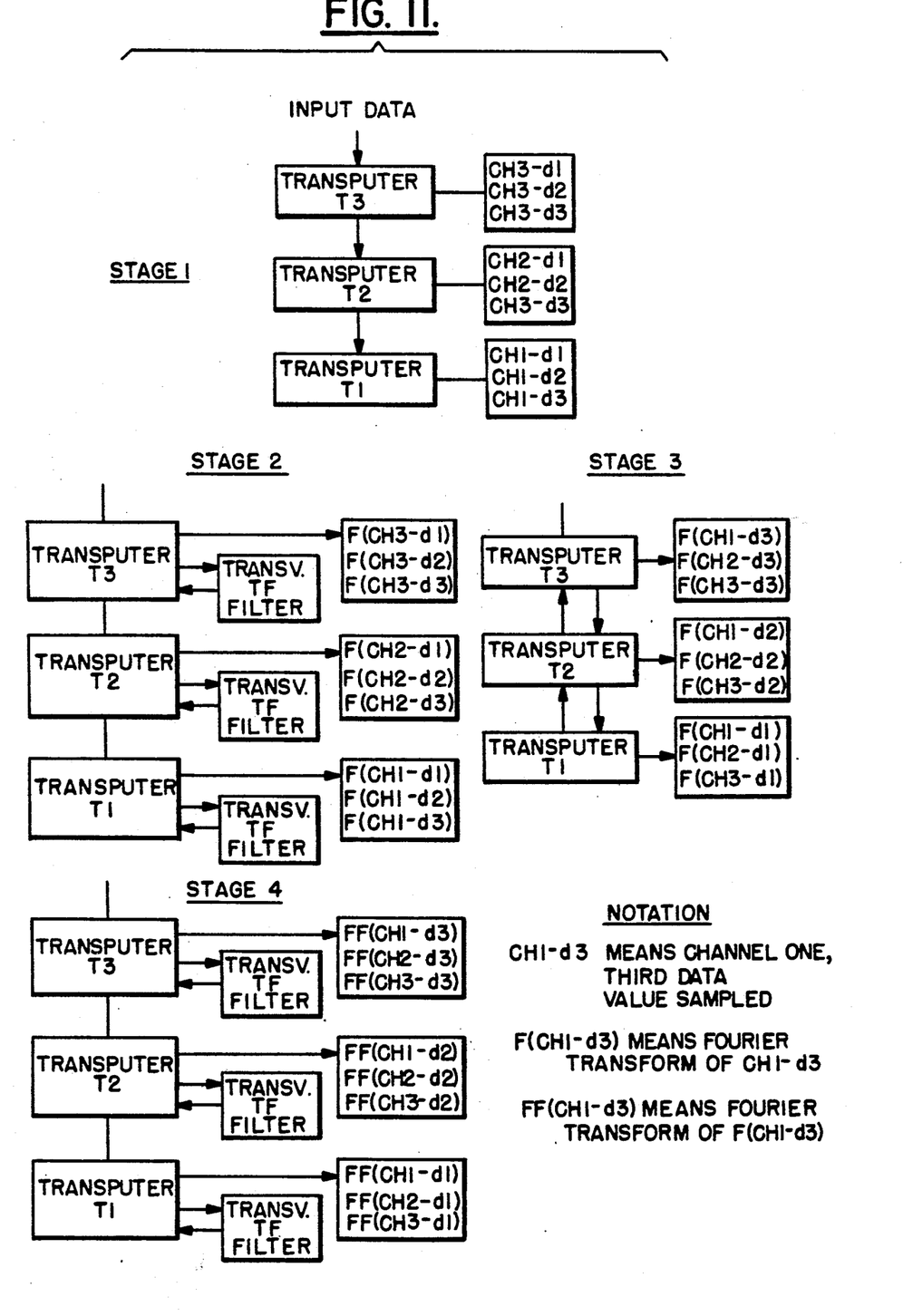
FIG. 11 is a series of diagrams illustrating the operation of the linear array of transputers in carrying out the 2-dimensional Fourier transform.

The seismic processing apparatus of FIG. 1 performs the Fourier transform on its linear array of transputers. FIG. 11 shows the stages in implementation of a two dimensional Fourier transform.

Stage 1 consists of loading the channel data into its allocated transputers memory (and may comprise the demultiplexing process described above).

Stage 2 consists of implementing a Fourier transform on each channel independently and concurrently, using the transversal filter as a high speed processor. The transformed data is stored in memory.

Stage 3 consists of transposing these data values between channels, the data corresponding to a particular value on the frequency axis and along the distance axis are arranged in order of increasing frequency. Transputer T1 now contains the values along the distance axis corresponding to a zero frequency. Transputer T2 contains the values along the distance axis corresponding to the first frequency value; and so on. This process can be carried out in parallel, each transputer placing a d value into a link, say first d1 is placed into the links. All these values for d1 for channels CH1 to CH3 can then flow into transputer T1 memory, by passing them along the link paths connecting each transputer. Then d2 can be placed into the links and so on.

Stage 4 consists of again using the transversal filter as a high speed processor to perform a Fourier transform on this transposed data that is stored in each transputer's memory area. The result will be the two-dimensional Fourier transform of the original data.

Migration

The objective of migration is to convert the angles of dip from the apparent dips displayed on the seismic section to the true dips of the geological bedding planes and to remove diffraction hyperbolae. The technique is to collapse these hyperbolae to a point.

A recent development uses a process called Wavenumber migration to carryout this task and this can be implemented on the apparatus of FIG. 1 as follows. The seismic data time section is converted to a depth section by multiplying by the velocity of sound, using the transputers in parallel for the respective channels. Then a two-dimensional Fourier transform is performed using the transputers and transversal filters, as described above. Then the transputers are used for "mapping" to effect a wavenumber domain migration, again operating in parallel on the respective channels. Next a two-dimensional Fourier inverse transform is carried out, as described above, and finally a depth-section to time-section conversion is effected to produce the required migrated seismic section.

Surface Consistent Geometric Corrections

A geometric correction that is sometimes performed after the application of earth terrain and normal moveout corrections is called surface consistent corrections. To perform this correction a cross-correlation is made between certain channels, which yields a time shift between adjacent channels. This time shift information can be used to make fine adjustments, and makes the data consistent over a range of stations. This correction can also be carried out on the linear transputer array of the apparatus of FIG. 1.

SUMMARY

The seismic processing apparatus which has been described is a portable apparatus able to carry out real time demultiplexing of the data acquired from the geophones or other receivers. At the same time as demultiplexing, certain other processing functions can be carried out by the transputers of the respective channels. Subsequently, the demultiplexed data can be further processed on the linear array of transputers, using the transversal filters when required, to perform e.g. correlation, geometric corrections, common depth point stacking, summing, filtering and Fourier transforms. The apparatus is capable of data acquisition and processing under the control of software programming using the minimum amount of hardware. Each processing stage may be displayed for quality control and assessment. The final seismic section may be produced on a small printer in the field, and later reproduced on a high definition graphic printer at a central processing station. The apparatus thus enables a maximum of processing stages to be carried out in the field.

It will be appreciated that each processing module such as shown in FIG. 2 may include one or more transputers in addition to th one which is connected in the linear array, and may include one or more additional transversal filters.

I claim:

1. A seismic processing apparatus which comprises a plurality of data processing modules (12), each module comprising a parallel processing device (T) and a transversal filter (TF), the parallel processing devices having respective links (L) for the input and output of data, and the parallel processing devices (T) of the plurality of modules (12) being connected by their links (L) into a linear array, each transversal filter (TF) being connected to the parallel processing device (T) of the same module and comprising an input register (R1), a plurality of active coefficient registers (R3), a plurality of parallel multipliers (MAA) for simultaneously multiplying together data words held in the input register and in respective active coefficient registers (R3), and a series of delay and adder devices (CDA) in which the outputs of the multipliers are accumulated.

2. A seismic processing apparatus as claimed in claim 1, further comprising:

memory means (EM1, EM2 ...) associated with each parallel processing device (T3—FIG. 7) of the linear array for receiving seismic data from a plurality of seismic wave receivers via a plurality of different channels, said seismic data being in a channel-sequential multiplexed form (i.e. CH1, CH2, CH3 ...) and means associated with a plurality of said parallel processing devices for passing said data along said linear array to effect demultiplexing by passing data received via the different channels to the memory means of respective parallel processing devices.

3. A seismic processing apparatus as claimed in claim 1, further comprising memory means associated with each parallel processing device and wherein:

the linear array of parallel processing devices comprises means for performing common depth point stacking;

said means for performing common depth point stacking includes means in said first parallel processing device of the array for receiving data for a succession of shot points in sequence, the data for each shot point (e.g. SP 18) comprising data for a set of channels (CH1, CH2 ...) in sequence, means for passing the first shot point data to respective parallel processing devices for the different channels and for loading the first shot point data into their memory means;

means for shifting data stored in the memory means of each parallel processing device to the memory means of a parallel processing device a predetermined number of said devices further down the linear array then the data for the second shot point being input to the first parallel processing device and the data for the different channels loaded into the memory means of the respective parallel processing devices and so on, and means for adding data from successive shot points to data already stored in the respective memory means.

4. A seismic processing apparatus as claimed in claim 1, wherein said seismic processing apparatus includes means for performing summing, correlation and/or convolution functions on data received by said linear array of parallel processing devices.

5. A seismic processing apparatus as claimed in claim 1, for processing seismic data received from a plurality of different channels further comprising:

memory means associated with each parallel processing device;

said seismic processing apparatus includes means for loading the data from the different channels into the memories of respective parallel processing devices or their transversal filters, for performing a first Fourier transform concurrently on the seismic data in the respective memory means, and means for transposing data between the different memory means, wherein said means for performing a first Fourier transform comprises means for performing a second Fourier transform concurrently on transposed data now in the respective memory means.

6. A method for processing seismic data received in a multiplexed form from a plurality of seismic wave receivers via a plurality of different channels, comprising:
arranging a plurality of parallel processing devices in a linear array, each of said plurality of parallel processing devices having an associated memory means, and associated transversal filter, and links for the input and output of data, with the parallel processing devices being connected by their links, each transversal filter comprising an input register, a plurality of active coefficient registers, a plurality of parallel multipliers, and a series of delay and adder devices for accumulating the outputs of the parallel multipliers;
demultiplexing said multiplexed data by passing said multiplexed seismic data along said linear array of parallel processing devices and causing said seismic data from each different channel to be received by the memory of a respective parallel processing device.

7. A method for processing seismic data utilizing a plurality of data processing modules, each module comprising a parallel processing device, a transversal filter, and a memory means, the parallel processing devices of the plurality of modules being connected by their links into a linear array, each transversal filter being connected to the parallel processing device of the same module and comprising an input register, a plurality of active coefficient registers, a plurality of parallel multipliers, and a series of delay and adder devices, said method comprising:
performing common depth point stacking by
receiving data in a first parallel processing device of said linear array a succession of shot points in sequence, the data for each shot point comprising data for a set of channels in sequence,
passing the data for the first shot point to respective parallel processing devices for the channels and loading the first shot point data into their memories,
shifting data stored in each parallel processing device memory to the memory of a parallel processing device a predetermined number of parallel processing devices further down the array,
repeating said passing and shifting steps for the data of said succession of shot points after said first shot point, wherein when the data for a shot point other than said first shot is loaded into the memory of a parallel processing device, it is added to data already stored therein.

8. A method for processing seismic data received from a plurality of different channels by utilizing a plurality of data processing modules, each module comprising a parallel processing device, a transversal filter, and a memory means, the parallel processing devices of the plurality of modules being connected by their links into a linear array, each transversal filter being connected to the parallel processing device of the same module and comprising an input register, a plurality of active coefficient registers, a plurality of parallel multipliers, and a series of delay and adder devices, said method comprising:
performing a two-dimensional Fourier transform on the seismic data by,
loading the data from the different channels into the memories of respective parallel processing devices,
performing a first Fourier transform concurrently on the seismic data in the respective memories of said parallel processing devices by controlling said parallel processing devices or their transversal filters,
transposing transformed data between said memories of said parallel processing devices, and
performing a second Fourier transform concurrently on the transposed data in the respective memories of said parallel processing devices.

9. A seismic processing apparatus which comprises:
a plurality of parallel processing devices having respective links for the input and output of data, the parallel processing devices being connected by their links into a linear array, the linear array comprising a means for performing common depth point stacking;
memory means associated with each parallel processing device; and
said means for performing common depth point stacking includes:
means in said first parallel processing device of the array for receiving data for a succession of shot points in sequence, the data for each shot point (e.g. SP18) comprising data for a set of channels (CH1, CH2, ...) in sequence;
means for passing the first shot point data to respective parallel processing devices for the different channels and for loading the first shot point data into their respective memory means;
means for shifting data stored in the memory means of each parallel processing device to the memory means of a parallel processing device a predetermined number of said devices further down the linear array; then the data for the second shot point being input to the first parallel processing device and the data for the different channels loaded into the memory means of the respective parallel processing devices, and so on, and means for adding data from each successive shot point to data already stored in respective memory means.

10. A data processing apparatus which comprises: a plurality of parallel processing devices having respective links for the input and output of data, the parallel processing devices being connected by their links into a linear array;
memory means associated with each parallel processing device;
means for controlling said parallel processing devices to load input data from different channels into the memory means of respective said parallel processing devices and then to concurrently perform a first Fourier transform on the data held in their respective memory means, to provide transformed data;
means for then transposing the transformed data between the memory means of the different parallel processing devices; wherein
said controlling means comprises means for causing the parallel processing devices to perform a second Fourier transform concurrently on the transformed data now in their respective memory means.

* * * * *